United States Patent
Wang et al.

(10) Patent No.: US 10,221,360 B2
(45) Date of Patent: Mar. 5, 2019

(54) METHOD AND DEVICE FOR FISCHER-TROPSCH SYNTHESIS

(71) Applicant: WUHAN KAIDI ENGINEERING TECHNOLOGY RESEARCH INSTITUTE CO., LTD., Wuhan (CN)

(72) Inventors: Daxiang Wang, Wuhan (CN); Pingyu Kuai, Wuhan (CN); Meng Li, Wuhan (CN); Yanfeng Zhang, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 0 days.

(21) Appl. No.: 15/831,358

(22) Filed: Dec. 4, 2017

(65) Prior Publication Data
US 2018/0094196 A1    Apr. 5, 2018

Related U.S. Application Data

(63) Continuation-in-part of application No. PCT/CN2016/079381, filed on Apr. 15, 2016.

(30) Foreign Application Priority Data

Jun. 9, 2015  (CN) .......................... 2015 1 0311714

(51) Int. Cl.
*C10G 2/00* (2006.01)
*C10K 1/00* (2006.01)
(Continued)

(52) U.S. Cl.
CPC .................. *C10G 2/34* (2013.01); *C01B 3/04* (2013.01); *C01B 3/52* (2013.01); *C10G 2/00* (2013.01); *C10G 2/35* (2013.01); *C10G 2/50* (2013.01); *C10J 3/00* (2013.01); *C10J 3/48* (2013.01); *C10J 3/84* (2013.01); *C10K 1/005* (2013.01); *C10K 1/122* (2013.01); *C10K 1/32* (2013.01); *C10J 2300/093* (2013.01);
(Continued)

(58) Field of Classification Search
CPC ... C01B 32/60; C01B 2203/00; B01D 53/965; C01D 7/07; C01D 7/14; C10G 2/30; C10K 3/04
See application file for complete search history.

(56) References Cited

U.S. PATENT DOCUMENTS

| | | | | |
|---|---|---|---|---|
| 9,702,049 B1* | 7/2017 | Parker | ....................... | C25B 9/10 |
| 2013/0005838 A1* | 1/2013 | Eilos | ......................... | C01B 3/16 |
| | | | | 518/703 |
| 2014/0328743 A1* | 11/2014 | Jones | ................. | B01D 53/1418 |
| | | | | 423/425 |

* cited by examiner

*Primary Examiner* — Jafar F Parsa
(74) *Attorney, Agent, or Firm* — Matthias Scholl P.C.; Matthias Scholl

(57) ABSTRACT

A method for Fischer-Tropsch synthesis, the method including: 1) gasifying a raw material to obtain a crude syngas including $H_2$, CO and $CO_2$; 2) electrolyzing a saturated NaCl solution using a chloralkali process to obtain a NaOH solution, $Cl_2$ and $H_2$; 3) removing the $CO_2$ in the crude syngas using the NaOH solution obtained in 2) to obtain a pure syngas; and 4) insufflating the $H_2$ obtained in 2) to the pure syngas to adjust a mole ratio of $CO/H_2$ in the pure syngas, and then introducing the pure syngas for Fischer-Tropsch synthesis reaction. A device for Fischer-Tropsch synthesis includes a gasification device, an electrolyzer, a first gas washing device, and a Fischer-Tropsch synthesis reactor.

6 Claims, 2 Drawing Sheets

(51) Int. Cl.
  *C10K 1/12* (2006.01)
  *C01B 3/04* (2006.01)
  *C01B 3/52* (2006.01)
  *C10J 3/84* (2006.01)
  *C10J 3/48* (2006.01)
  *C10J 3/00* (2006.01)
  *C10K 1/32* (2006.01)
(52) U.S. Cl.
  CPC .................. *C10J 2300/0916* (2013.01); *C10J 2300/0946* (2013.01); *C10J 2300/1659* (2013.01); *Y02E 60/364* (2013.01)

METHOD AND DEVICE FOR FISCHER-TROPSCH SYNTHESIS

CROSS-REFERENCE TO RELATED APPLICATIONS

This application is a continuation-in-part of International Patent Application No. PCT/CN2016/079381 with an international filing date of Apr. 15, 2016, designating the United States, now pending, and further claims foreign priority to Chinese Patent Application No. 201510311714.9 filed Jun. 9, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The present disclosure relates to a method and device for Fischer-Tropsch synthesis.

Description of the Related Art

Conventionally, the hydrogen/carbon ratio in the syngas produced from coal or biomass is relatively low and such syngas cannot be directly used for Fischer-Tropsch synthesis. The relatively low amount of hydrogen leads to low efficiency and low catalyst regeneration level.

Typically, the hydrogen/carbon ratio of the crude syngas is adjusted by using water-gas shift and decarburization process. The process is long and costly, involves complex steps, and produces a relatively large amount of greenhouse gases, including $CO_2$.

SUMMARY OF THE INVENTION

It is one objective of the present disclosure to provide a method and device for Fischer-Tropsch synthesis. The method and device improve the hydrogen/carbon ratio in the syngas, and decrease the emission of greenhouse gases, including $CO_2$.

To achieve the above objective, in accordance with one embodiment of the present disclosure, there is provided a method for Fischer-Tropsch synthesis, the method comprising:

1) gasifying a raw material to obtain a crude syngas comprising $H_2$, CO and $CO_2$;
2) electrolyzing a saturated NaCl solution using a chloralkali process to obtain a NaOH solution, $Cl_2$ and $H_2$;
3) removing the $CO_2$ from the crude syngas using the NaOH solution obtained in 2) to obtain a pure syngas; and
4) insufflating the $H_2$ obtained in 2) to the pure syngas to adjust a mole ratio of $CO/H_2$ in the pure syngas, and then introducing the pure syngas for Fischer-Tropsch synthesis reaction.

In a class of this embodiment, in 3), the $CO_2$ dispersed in the crude syngas is removed during a direct gas-liquid contact between the NaOH solution and the crude syngas yielding the pure syngas.

In a class of this embodiment, in 3), the $CO_2$ is first separated from the crude syngas to yield pure syngas, and then the $CO_2$ is absorbed using the NaOH solution.

In a class of this embodiment, in 3), a remaining of the NaOH solution after absorbing $CO_2$ in the crude syngas, is condensed and crystallized as a by-product.

In a class of this embodiment, in 3), a remaining of the NaOH solution after absorbing $CO_2$ in the crude syngas, is used for removing $CO_2$ in an industrial waste gas or gases generated in other processes.

In a class of this embodiment, in 4), a mole ratio of $CO/H_2$ in the pure syngas is adjusted to 1:1.5 to 2.5.

In a class of this embodiment, in 1), the components of the obtained crude syngas are controlled to CO: 5-60%, $H_2$: 5-45%, $CO_2$: 5-30% on a dry basis, and the balance is inevitable impurity gases.

In a class of this embodiment, in 1), the raw material is coal, biomass, heavy oil, natural gas, agroforestry waste, household waste, or a mixture thereof.

A device for Fischer-Tropsch synthesis designed to realize the above process comprises a gasification device, an electrolyzer, a first gas washing device, and a Fischer-Tropsch synthesis reactor, where a syngas outlet end of the gasification device is connected to a gas inlet of the first gas washing device via the pipe system, and a gas outlet of the first gas washing device is connected to a feed gas inlet of the Fischer-Tropsch synthesis reactor via the pipe system; a hydrogen outlet of the electrolyzer is also connected to the feed gas inlet of the Fischer-Tropsch synthesis reactor via the pipe system, and a caustic soda solution outlet of the electrolyzer is connected to a washing solution inlet of the first gas washing device via the pipe system.

In a class of this embodiment, the caustic soda solution outlet of the electrolyzer is further connected to a washing solution inlet of a second gas washing device via the pipe system, a gas inlet of the second gas washing device is connected to a pipe conveying flue gas or other $CO_2$-containing gases, and a gas outlet of the second gas washing device is connected to a downstream process pipe or atmosphere.

In a class of this embodiment, the gas washing device is a packed tower, a sieve plate tower or a spray tower.

Another device for Fischer-Tropsch synthesis designed to realize the above process comprises a gasification device, an electrolyzer, a decarburization device, a first gas washing device and a Fischer-Tropsch synthesis reactor, where a syngas outlet end of the gasification device is connected to a crude syngas inlet of the decarburization device via the pipe system, a pure syngas outlet of the decarburization device is connected to a feed gas inlet of the Fischer-Tropsch synthesis reactor via the pipe system, and a carbon dioxide outlet of the decarburization device is connected to a gas inlet of the first gas washing device via the pipe system; a hydrogen outlet of the electrolyzer is also connected to the feed gas inlet of the Fischer-Tropsch synthesis reactor via the pipe system, and a caustic soda solution outlet of the electrolyzer is connected to a washing solution inlet of the first gas washing device via the pipe system.

In a class of this embodiment, the caustic soda solution outlet of the electrolyzer is further connected to a washing solution inlet of a second gas washing device via the pipe system, a gas inlet of the second gas washing device is connected to a pipe conveying flue gas or other $CO_2$-containing gases, and a gas outlet of the second gas washing device is connected to a downstream process pipe or atmosphere.

In a class of this embodiment, the gas washing device is a packed tower, a sieve plate tower or a spray tower.

In a class of this embodiment, the decarburization device is a pressure swing adsorption device or a low-temperature methanol washing device.

Advantages of the method and device for Fischer-Tropsch synthesis according to embodiments of the present disclosure are summarized as follows.

Firstly, the present invention introduces chloralkali to Fischer-Tropsch synthesis process, organically combines the chloralkali process with Fischer-Tropsch synthesis, adjusts the composition of pure syngas in the Fischer-Tropsch synthesis process using hydrogen that is a product of chloralkali, so as to meet the gas intake requirements of carbon/hydrogen mole ratio (CO/H$_2$) in the syngas for Fischer-Tropsch synthesis reaction, thereby simplifying treatment of water-gas shift process, and achieving the purpose of simplifying or eliminating conversion process in the Fischer-Tropsch synthesis.

Secondly, the present invention also removes carbon dioxide from the crude syngas through contact between caustic soda solution that is another product of chloralkali and the CO$_2$-containing crude syngas, which not only has important significance for reducing emissions of greenhouse gases, but also economically and efficiently uses chloralkali products.

Thirdly, the device of the present invention simplifies the conversion process in the Fischer-Tropsch synthesis process, and greatly improves the economic efficiency of the Fischer-Tropsch synthesis process and device.

DETAILED DESCRIPTION OF THE EMBODIMENTS

For further illustrating the invention, experiments detailing a method and device for Fischer-Tropsch synthesis are described below. It should be noted that the following examples are intended to describe and not to limit the invention.

Figure 1:
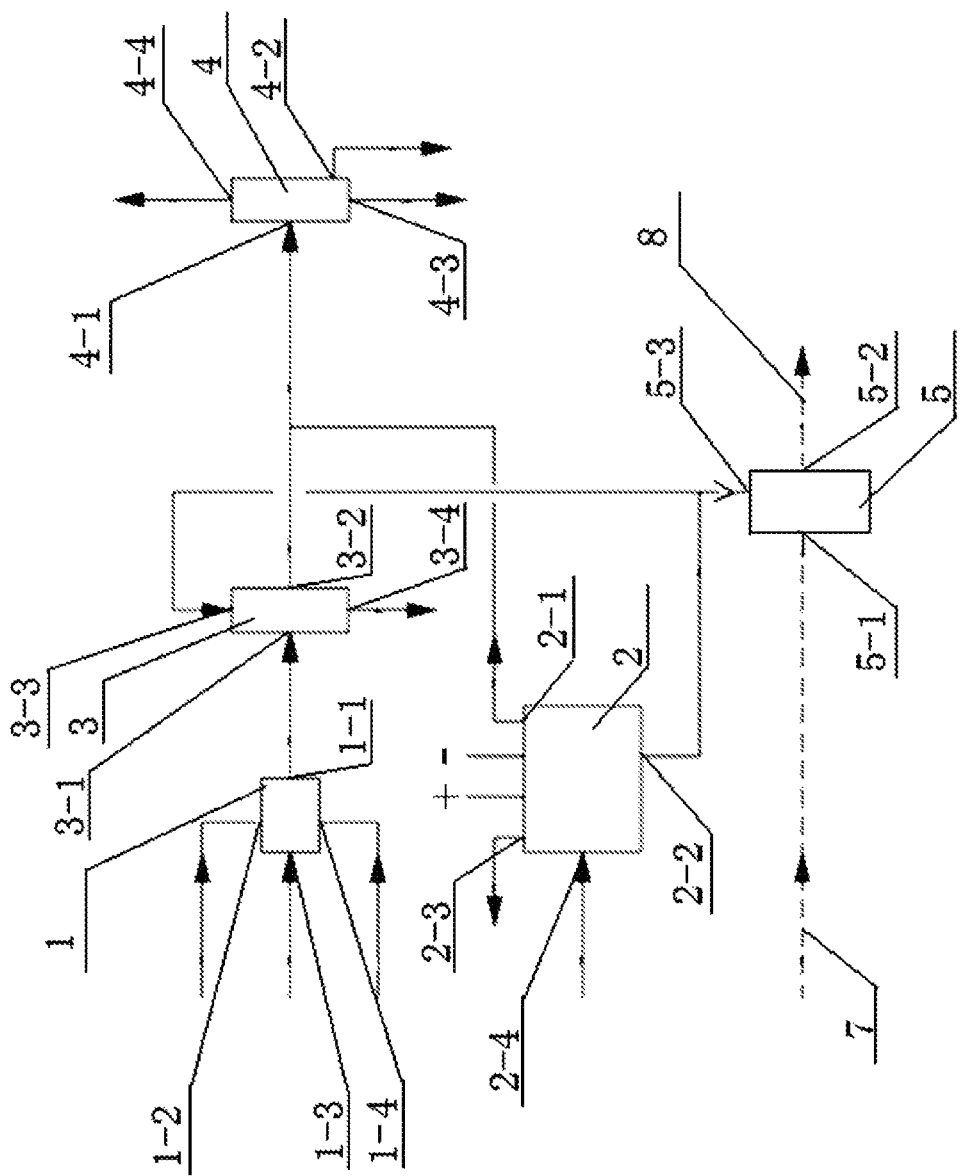
FIG. 1 is a structural diagram of a device for Fischer-Tropsch synthesis in accordance with one embodiment of the present invention.

FIG. 1 shows a device for Fischer-Tropsch synthesis, comprising a gasification device 1, an electrolyzer 2, a first gas washing device 3 and a Fischer-Tropsch synthesis reactor 4, where the gasification device 1 is a gasifier, which may be a Luigi gasifier, a Texaco gasifier, a Shell gasifier or a Hangtian gasifier, and comprises a raw material inlet 1-2, an oxidant inlet 1-3, a water inlet 1-4 and a syngas outlet end 1-1; the electrolyzer 2 comprises a hydrogen outlet 2-1, a caustic solution outlet 2-2, a chlorine outlet 2-3 and a saturated NaCl solution inlet 2-4; the Fischer-Tropsch synthesis reactor 4 comprises a feed gas inlet 4-1, a synthetic product outlet 4-2, an effluent and waste outlet 4-3 and an flue gas outlet 4-4; the first gas washing device 3 comprises a gas inlet 3-1, a gas outlet 3-2, a washing solution inlet 3-3 and a byproduct outlet 3-4; a second gas washing device 5 comprises a gas inlet 5-1, a gas outlet 5-2 and a washing solution inlet 5-3. The syngas outlet end 1-1 of the gasification device 1 is connected to the gas inlet 3-1 of the first gas washing device 3 via the pipe system, and the gas outlet 3-2 of the first gas washing device 3 is connected to the feed gas inlet 4-1 of the Fischer-Tropsch synthesis reactor 4 via the pipe system; the hydrogen outlet 2-1 of the electrolyzer 2 is also connected to the feed gas inlet 4-1 of the Fischer-Tropsch synthesis reactor 4 via the pipe system, and the caustic soda solution outlet 2-2 of the electrolyzer 2 is connected to the washing solution inlet 3-3 of the first gas washing device 3 via the pipe system; the caustic soda solution outlet 2-2 of the electrolyzer 2 is further connected to a washing solution inlet 5-3 of the second gas washing device 5 via the pipe system, the gas inlet 5-1 of the second gas washing device is connected to a pipe 7 of waste gas or other CO$_2$-containing gases, and the gas outlet 5-2 of the second gas washing device 5 is connected to a downstream process pipe 8 or atmosphere. The first gas washing device 3 and the second gas washing device 5 therein are respectively a packed tower, a sieve plate tower or a spray tower.

Figure 2:
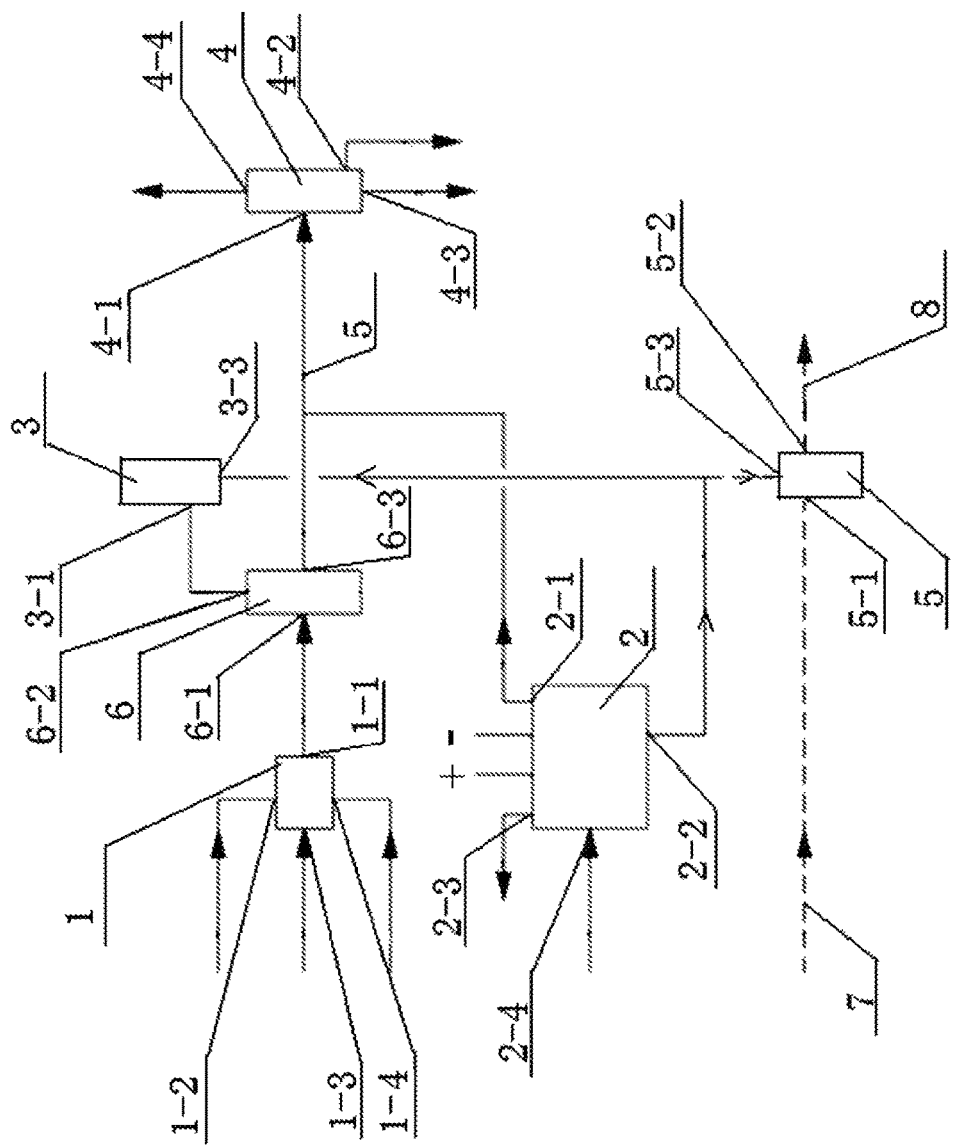
FIG. 2 is a modified structure of a device for Fischer-Tropsch synthesis in FIG. 1.

FIG. 2 shows another device for Fischer-Tropsch synthesis, which is a modified structure of FIG. 1, and comprises a gasification device 1, an electrolyzer 2, a decarburization device 6, a first gas washing device 3 and a Fischer-Tropsch synthesis reactor 4, where a syngas outlet end 1-1 of the gasification device 1 is connected to a crude syngas inlet 6-1 of the decarburization device 6 via the pipe system, a pure syngas outlet 6-3 of the decarburization device 6 is connected to a feed gas inlet 4-1 of the Fischer-Tropsch synthesis reactor 4 via the pipe system, a carbon dioxide outlet 6-2 of the decarburization device 6 is connected to a gas inlet 3-1 of the first gas washing device 3 via the pipe system; a hydrogen outlet 2-1 of the electrolyzer 2 is also connected to the feed gas inlet 4-1 of the Fischer-Tropsch synthesis reactor 4 via the pipe system, and a caustic soda solution outlet 2-2 of the electrolyzer 2 is connected to a washing solution inlet 3-3 of the first gas washing device 3 via the pipe system; the caustic soda solution outlet 2-2 of the electrolyzer 2 is further connected to a washing solution inlet 5-3 of a second gas washing device 5 via the pipe system, a gas inlet 5-1 of the second gas washing device 5 is connected to a pipe 7 of waste gas or other CO$_2$-containing gases, and a gas outlet 5-2 of the second gas washing device 5 is connected to a downstream process pipe 8 or atmosphere. The first gas washing device 3 and the second gas washing device 5 therein are respectively a packed tower, a sieve plate tower or a spray tower; and the decarburization device 6 is a pressure swing adsorption device or a low-temperature methanol washing device.

The technical process of the device for Fischer-Tropsch synthesis shown in FIG. 1 comprises the following steps: the raw material, oxidant and water for Fischer-Tropsch synthesis are introduced to the gasification device 1 for gasification respectively from the raw material inlet 1-2, the oxidant inlet 1-3 and the water inlet 1-4 of the gasification device 1 to obtain a crude syngas with the main components of H$_2$, CO and CO$_2$, the compositions of which are CO: 5 to 60%, H$_2$: 5 to 45% and CO$_2$: 5 to 30% on a dry basis, and the balance is inevitable impurity gases. Crude syngas output from the syngas outlet end 1-1 of the gasification device 1 enters the first gas washing device 3 from the gas inlet 3-1 of the first gas washing device 3. At the same time, saturated NaCl solution is electrolyzed into hydrogen, chlorine and NaOH solution in the electrolyzer 2, the NaOH solution generated through electrolysis is introduced via the caustic soda solution outlet 2-2 into the first gas washing device 3 from the washing solution inlet 3-3 of the first gas washing device 3 to obtain a pure syngas through removing CO$_2$ in a crude syngas. At the same time, the generated NaHCO$_3$ and Na$_2$CO$_3$ solution is discharged from the byproduct outlet 3-4 of the first gas washing device 3, and is sold or used as a solid product after concentration and crystallization. The remaining NaOH solution after absorbing the crude syngas can be used for removing $CO_2$ in an industrial waste gas or gases generated in other processes. In addition, at the same time, $H_2$ obtained through chloralkali is insufflated into the pure syngas to adjust the carbon/hydrogen mole ratio ($CO/H_2$) in the pure syngas to 1:1.5 to 2.5 according to the requirements of hydrogen flow rate control in Fischer-Tropsch synthesis, and then the pure syngas is input into the Fischer-Tropsch synthesis reactor 4 from the feed gas inlet 4-1 of the Fischer-Tropsch synthesis reactor 4 to produce corresponding liquid hydrocarbons and paraffin products through synthetic reaction. Liquid hydrocarbon products obtained through the reaction are output from the synthetic product outlet 4-2, effluent and waste flow out from the effluent and waste outlet 4-3, and flue gas is emitted from the flue gas outlet 4-4. Please see Examples 1 to 3 for detailed technical operation process.

The difference between the technical process shown in FIG. 2 and the technical process shown in FIG. 1 is that in FIG. 1, the pure syngas is obtained through removing $CO_2$ in the crude syngas by direct full gas-liquid contact between the NaOH solution and the crude syngas, while in FIG. 2, the pure syngas is obtained through centralized separation of $CO_2$ in the crude syngas, and then $CO_2$ obtained through centralized separation is absorbed using the NaOH solution. Please see Examples 4 to 6 for detailed technical operation process.

In addition, the NaOH solution generated through electrolysis in the electrolyzer 2 may no longer be used to absorb $CO_2$ in the crude syngas or flue gas, and the entire set of chloralkali device is only used to adjust the carbon/hydrogen mole ratio in the syngas as a hydrogen source.

EXAMPLE 1

A normal pressure biomass gasifier is employed, with biomass as raw material, air as an oxidant, the flow rate of the syngas is 8200 kmol/h, the composition of the syngas on a dry basis is (mol. %): CO: 23.28%, $H_2$: 8.65%, $CO_2$: 16.82%, $N_2$: 50.19%, Ar: 0.65%, and other impurity gases: 0.41%.

Refer to FIG. 1, the technical process is described as follows: the flow rate of the raw material NaCl solution in the chloralkali process is controlled at 5454.81 kmol/h, the NaOH solution obtained therefrom is used to wash the syngas and absorb $CO_2$ therein to obtain a pure syngas. 2759.14 kmol/h NaOH solution is consumed in this process, and the remaining NaOH (2695.67 kmol/h) is used to absorb the flue gas; $H_2$ obtained from the chloralkali process is mixed with the pure syngas after gas washing to adjust the hydrogen/carbon ratio in the syngas, then the mixed gas is used as the feed gas for Fischer-Tropsch synthesis, and $Cl_2$ obtained from the chloralkali process is converted to liquid chlorine for sale, where the $H_2$ content (mol. %) is 10.4% in the pure syngas after gas washing, and is 35.99% in the feed gas for Fischer-Tropsch synthesis.

The $CO_2$ absorption rate in the syngas reaches 99%, and $CO/H_2$ is 1:1.8 in the feed gas for Fischer-Tropsch synthesis.

EXAMPLE 2

A normal pressure biomass gasifier is employed, with biomass as raw material, 98% (mol. %) $O_2$ as an oxidant, the flow rate of the syngas is 8200 kmol/h, the compositions of the syngas on a dry basis is (mol. %): CO: 48.10%, $H_2$: 23.29%, $CO_2$: 20.84%, $N_2$: 3.56%, and other impurity gases: 4.20%.

Refer to FIG. 1, the technical process is described as follows: the flow rate of the raw material NaCl solution in the chloralkali process is controlled at 10380.08 kmol/h, the NaOH solution obtained therefrom is used to wash the syngas and absorb $CO_2$ therein to obtain a pure syngas. 1708.88 kmol/h NaOH solution is consumed in this process, and the remaining NaOH (8671.20 kmol/h) is used to absorb the flue gas; $H_2$ obtained from the chloralkali process is mixed with the pure syngas after gas washing to adjust the hydrogen/carbon ratio in the syngas, then the mixed gas is used as the feed gas for Fischer-Tropsch synthesis, and $Cl_2$ obtained from the chloralkali process is converted to liquid chlorine for sale, where the $H_2$ content (mol. %) is 29.43% in the pure syngas after gas washing, and is 60.78% in the feed gas for Fischer-Tropsch synthesis.

The $CO_2$ absorption rate in the syngas reaches 99%, and $CO/H_2$ is 1:1.8 in the feed gas for Fischer-Tropsch synthesis.

EXAMPLE 3

A normal pressure Texaco gasifier is employed. Coarse coal as raw material and 99% (mol. %) $O_2$ as an oxidant are mixed with water to yield water coal slurry which is then put into the gasifier. The flow rate of the syngas is 23622 kmol/h, the compositions of the syngas on a dry basis is (mol. %): CO: 40.28%, $H_2$: 48.28%, $CO_2$: 7.94%, $N_2$: 3.10%, and other impurity gases: 0.40%.

Refer to FIG. 1, the technical process is described as follows: the flow rate of the raw material NaCl solution in the chloralkali process is controlled at 13347.37 kmol/h, the NaOH solution obtained therefrom is used to wash the syngas and absorb $CO_2$ therein to obtain a pure syngas. 3751.17 kmol/h NaOH solution is consumed in this process, and the remaining NaOH (9596.20 kmol/h) is used to absorb the flue gas; $H_2$ obtained from the chloralkali process is mixed with the pure syngas after gas washing to adjust the hydrogen/carbon ratio in the syngas, then the mixed gas is used as the feed gas for Fischer-Tropsch synthesis, and $Cl_2$ obtained from the chloralkali process is converted to liquid chlorine for sale, where the $H_2$ content (mol. %) is 52.44% in the pure syngas after gas washing, and is 63.61% in the feed gas for Fischer-Tropsch synthesis.

The $CO_2$ absorption rate in the syngas reaches 99%, and $CO/H_2$ is 1:1.9 in the feed gas for Fischer-Tropsch synthesis.

EXAMPLE 4

A normal pressure biomass gasifier is employed, with biomass as raw material, air as a combustion improver, the flow rate of the syngas is 8200 kmol/h, the compositions of the syngas on a dry basis is (mol. %): CO: 23.28%, $H_2$: 8.65%, $CO_2$: 16.82%, $N_2$: 50.19%, Ar: 0.65%, and other impurity gases: 0.41%.

Refer to FIG. 2, the technical process is described as follows: the flow rate of the raw material NaCl solution in the chloralkali process is controlled at 5454.81 kmol/h, the NaOH solution obtained therefrom is used to absorb $CO_2$ resulting from a pressure swing adsorptive decarburization of the syngas to yield a pure syngas. 2759.14 kmol/h NaOH solution is consumed in this process, and the remaining NaOH (2695.67 kmol/h) is used to absorb the flue gas; $H_2$ obtained from the chloralkali process is mixed with the pure syngas after gas washing to adjust the hydrogen/carbon ratio in the syngas, then the mixed gas is used as the feed gas for Fischer-Tropsch synthesis, and $Cl_2$ obtained from the chloralkali process is converted to liquid chlorine for sale, where the $H_2$ content (mol. %) is 10.4% in the pure syngas after gas washing, and is 35.99% in the feed gas for Fischer-Tropsch synthesis.

The $CO_2$ absorption rate in the syngas reaches 99%, and $CO/H_2$ is 1:1.8 in the feed gas for Fischer-Tropsch synthesis.

EXAMPLE 5

A normal pressure biomass gasifier is employed, with biomass as raw material, air as a combustion improver, the flow rate of the syngas is 8200 kmol/h, the compositions of the syngas on a dry basis is (mol. %): CO: 48.10%, $H_2$: 23.29%, $CO_2$: 20.84%, $N_2$: 3.56%, and other impurity gases: 4.20%.

Refer to FIG. 2, the technical process is described as follows: the flow rate of the raw material NaCl solution in the chloralkali process is controlled at 10380.08 kmol/h, the NaOH solution obtained therefrom is used to absorb $CO_2$ resulting from a pressure swing adsorptive decarburization of the syngas to obtain a pure syngas. 1708.88 kmol/h NaOH solution is consumed in this process, and the remaining NaOH (8671.2 kmol/h) is used to absorb the flue gas; $H_2$ obtained from the chloralkali process is mixed with the pure syngas after gas washing to adjust the hydrogen/carbon ratio in the syngas, then the mixed gas is used as the feed gas for Fischer-Tropsch synthesis, and $Cl_2$ obtained from the chloralkali process is converted to liquid chlorine for sale, where the $H_2$ content (mol. %) is 29.43% in the pure syngas after gas washing, and is 60.78% in the feed gas for Fischer-Tropsch synthesis.

The $CO_2$ absorption rate in the syngas reaches 99%, and $CO/H_2$ is 1:1.8 in the feed gas for Fischer-Tropsch synthesis.

EXAMPLE 6

A normal pressure Texaco gasifier is employed. Coarse coal as raw material and 99% (mol. %) $O_2$ as an oxidant are mixed with water to yield water coal slurry which is then put into the gasifier, the flow rate of the syngas is 23622 kmol/h, the compositions of the syngas on a dry basis is (mol. %): CO: 40.28%, $H_2$: 48.28%, $CO_2$: 7.94%, $N_2$: 3.1%, and other impurity gases: 0.40%.

Refer to FIG. 2, the technical process is described as follows: the flow rate of the raw material NaCl solution in the chloralkali process is controlled at 13347.37 kmol/h, the NaOH solution obtained therefrom is used to absorb $CO_2$ resulting from decarburization of the syngas using low temperature methanol to yield a pure syngas. 3751.17 kmol/h NaOH solution is consumed in this process with, and the remaining NaOH (9596.20 kmol/h) is used to absorb the flue gas; $H_2$ obtained from the chloralkali process is mixed with the pure syngas after gas washing to adjust the hydrogen/carbon ratio in the syngas, then the mixed gas is used as the feed gas for Fischer-Tropsch synthesis, and $Cl_2$ obtained from the chloralkali process is converted to liquid chlorine for sale, where the $H_2$ content (mol. %) is 52.44% in the pure syngas after gas washing, and is 63.61% in the feed gas for Fischer-Tropsch synthesis.

The $CO_2$ absorption rate in the syngas reaches 99%, and $CO/H_2$ is 1:1.9 in the feed gas for Fischer-Tropsch synthesis.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for Fischer-Tropsch synthesis, the method comprising:
1) gasifying a raw material to obtain a crude syngas comprising $H_2$, CO and $CO_2$;
2) electrolyzing a saturated NaCl solution using a chloralkali process to obtain a NaOH solution, $Cl_2$, and $H_2$;
3) separating the $CO_2$ from the crude syngas to obtain separated $CO_2$ and a first gaseous mixture, and then absorbing the separated $CO_2$ using the NaOH solution obtained in 2); and
4) adding the $H_2$ obtained in 2) into the first gaseous mixture to obtain a second gaseous mixture, and then using the second gaseous mixture for Fischer-Tropsch synthesis reaction.

2. The method of claim 1, wherein in 3), a remaining of the NaOH solution after absorbing the separated $CO_2$ is condensed and crystallized as a by-product.

3. The method of claim 1, wherein in 3), a remaining of the NaOH solution after absorbing the separated $CO_2$ is used for removing $CO_2$ in an industrial waste gas or gases generated in other processes.

4. The method of claim 1, wherein in 4), a mole ratio of $CO/H_2$ in the second gaseous mixture is adjusted to 1:1.5 to 2.5.

5. The method of claim 1, wherein in 1), the crude syngas comprises CO: 5-60 mol. %, $H_2$: 5-45 mol. %, $CO_2$: 5-30 mol. % on a dry basis, and the balance is impurity gases.

6. The method of claim 1, wherein in 1), the raw material is coal, biomass, heavy oil, natural gas, agroforestry waste, household waste, or a mixture thereof.

\* \* \* \* \*